United States Patent
Fujita et al.

(10) Patent No.: US 7,803,194 B2
(45) Date of Patent: Sep. 28, 2010

(54) SINTERED BODY OF TITANIUM COMPOUND

(75) Inventors: Tatsushi Fujita, Fukushima (JP);
Kenichi Tamura, Fukushima (JP);
Yuriko Morisaki, Hokkaido (JP)

(73) Assignee: Immuno-Science Co., Ltd., Sapporo-shi (JP)

( * ) Notice: Subject to any disclaimer, the term of this patent is extended or adjusted under 35 U.S.C. 154(b) by 0 days.

(21) Appl. No.: 12/240,482

(22) Filed: Sep. 29, 2008

(65) Prior Publication Data
US 2009/0098038 A1    Apr. 16, 2009

Related U.S. Application Data

(62) Division of application No. 10/581,741, filed as application No. PCT/JP2004/018851 on Dec. 10, 2004, now abandoned.

(30) Foreign Application Priority Data

Dec. 18, 2003   (JP)   ............................ 2003-421387
Jul. 15, 2004   (JP)   ............................ 2004-208462

(51) Int. Cl.
*A61F 2/28*   (2006.01)
*C04B 35/00*   (2006.01)
*C09K 3/00*   (2006.01)
*C04B 35/465*   (2006.01)
*C01B 25/45*   (2006.01)

(52) U.S. Cl. .................... 623/23.56; 106/35; 433/201.1; 501/1; 501/136

(58) Field of Classification Search ................. 423/306; 501/94, 1, 136; 623/23.56; 106/35; 433/201.1
See application file for complete search history.

(56) References Cited

U.S. PATENT DOCUMENTS

| | | | | |
|---|---|---|---|---|
| 3,639,132 A | * | 2/1972 | Egerton et al. | ............... 501/134 |
| 3,948,813 A | * | 4/1976 | Holcombe et al. | ....... 252/518.1 |
| 4,842,517 A | | 6/1989 | Kawahara et al. | |
| 5,731,251 A | * | 3/1998 | Kishi | ......................... 501/134 |
| 6,585,992 B2 | | 7/2003 | Pugh et al. | |
| 6,843,943 B1 | | 1/2005 | Adolfsson et al. | |
| 6,846,493 B2 | | 1/2005 | Pugh et al. | |

(Continued)

FOREIGN PATENT DOCUMENTS

EP       299342 A1    1/1989

(Continued)

OTHER PUBLICATIONS

Li, P. Li et al, "Bioactive Ca10(PO4)6(OH)2-TiO2 composite coating prepared by sol -gel process", Journal of Sol-Gel Science and Technology (1996), 7(1/2), 27-34. (no month).*

(Continued)

*Primary Examiner*—Wayne Langel
(74) *Attorney, Agent, or Firm*—Birch, Stewart, Kolasch & Birch, LLP

(57) ABSTRACT

The present invention provides a sintered body of titanium compound obtained by sintering the titanium compound and a method for producing the same. A titanium compound represented by the formula (1) or (2) below is sintered.

$$[Ca_{10}(PO_4)_6]TiO_3 \cdot nH_2O \qquad (1)$$

$$[Ca_{10}(PO_4)_6]TiO_2(OH)_2 \qquad (2)$$

(In the formulae, n is an integer of from 0 to 3).

The obtained sintered body substantially consists of perovskite and whitlokite.

12 Claims, 2 Drawing Sheets

U.S. PATENT DOCUMENTS

2003/0003160 A1    1/2003   Pugh et al.

FOREIGN PATENT DOCUMENTS

| JP | 63-143057 A | 6/1988 |
|---|---|---|
| JP | 64-018973 A | 1/1989 |
| JP | 1-111763 A | 4/1989 |
| JP | 3-186272 A | 8/1991 |
| JP | 5-306108 A | 11/1993 |
| JP | 11-130412 A | 5/1999 |
| JP | 2000-327315 A | 11/2000 |
| JP | 2001-302229 A | 10/2001 |
| JP | 2003-175338 A | 6/2003 |

OTHER PUBLICATIONS

S. Nadir et al, "Thermal behaviour of hydroxyapatite with various oxides", Journal de Chimie Physique et de Physico-Chimie Biologique (1991), 88(10), 1919-24. (no month).*

Roop Kumar et al, "Functionally graded bioactive coatings of hydroxyapatite/titanium oxide composite system", Materials Letters (2002), 55(3), 133-137. (no month).*

E. Fidancevska et al, "Thermal-expansion and Mechanical Properties of the Ca10(PO4)6(OH)2-TiO2 composite", Science of Sintering (2002), 34(3), 241-246. (no month).*

Manjubala I et al., Biomaterials, Elsevier Science Publishers, Oct. 2000, vol. 21, No. 19, pp. 1995-2002.

Vu and Heimann, Journal of Materials Science Letters, 1997, vol. 16, pp. 1680-1682.

* cited by examiner

SINTERED BODY OF TITANIUM COMPOUND

This application is a Divisional of application Ser. No. 10/581,741 filed on Jun. 6, 2006 now abandoned and for which priority is claimed under 35 U.S.C. §120, which is the national phase of PCT International Application No. PCT/JP2004/018851 filed on Dec. 10, 2004 under 35 U.S.C. §371. The entire contents of each of the above-identified applications are hereby incorporated by reference.

TECHNICAL FIELD

The present invention relates to a novel titanium compound. Further, the present invention relates to a sintered body of a titanium compound obtained by sintering the titanium compound, and a method for producing the same. Further, the present invention relates to an artificial bone material, an artificial joint material, an artificial tooth material or an artificial dental root (implant) material, constituted of those sintered bodies of the titanium compound. Further, the present invention relates to as artificial bone, an artificial joint, an artificial tooth or an artificial dental root, comprising those sintered bodies of the titanium compound.

BACKGROUND ART

Apatite has excellent bioaffinity and can directly be bonded, to a bone tissue. Therefore, the apatite is widely used as a material for an artificial, bone or an artificial dental root. Above all, calcium hydroxyapatite is a main component of a living hard tissue such as a bone or a tooth, and therefore is one of materials most well utilized. Further, it is known that β-tricalcium phosphate (hereinafter referred to as "β-TCP") is easily absorbed in a bone, and is easily substituted with a new bone alter being embedded in a living body.

On the other hand, it is known that titanium has excellent strength and has low reactivity to a living body, and for this reason, is widely used, as a material for an artificial joint or an artificial dental root (JP-A-63-143057).

It is desirable that after once being embedded in the body, the material for an artificial joint, an artificial dental root, and the like is strongly bonded to a bone tissue, and is united with the bone tissue.

However, titanium has low reactivity to a living body as described above, but on the other hand, has low affinity with a living tissue. Therefore, it was difficult to unite titanium with a hone tissue.

For this reason, it has been conducted to cover a surface of titanium with apatite for the purpose of increasing adaptability of titanium to a bone tissue (for example, JP-A-3-186272).

In this case, however, it has been a current situation that a satisfactory bioadaptability is not obtained.

On the other hand, as other composite material using apatite and titanium, a titanium compound produced by a coprecipitation method is reported (JP-A-2000-327315 and JP-A-2001-302229). The titanium compound is in a form of powder, and a product obtained by sintering this has not been known.

Further, it is known that of inorganic substances, there are some substances to be difficult to sinter the same alone as in β-TCP or the like. It is not known that the inorganic substance is mixed with the titanium compound above, and then sintered.

DISCLOSURE OF THE INVENTION

The objects of the present invention are to provide a sintered body of a titanium compound obtained by sintering the titanium compound, and a method for producing the same. Further, the objects of the present invention are to provide a sintered body obtained by sintering a mixture of a titanium compound and an inorganic substance, and a method for producing the same.

The present inventors have found that a sintered body of a titanium compound can be obtained by sintering the titanium compound under specific conditions, and such a sintered body is suitable as a material for an artificial bone and the like, and have completed the present invention. Further, the present inventors have found that a sintered body can be obtained by sintering a mixture containing a titanium compound and an inorganic substance under specific conditions, and such a sintered body is suitable as a material for an artificial bone and the like, and have completed the present invention.

That is, the present invention is a titanium compound represented by the following formula (1) or (2):

$$[Ca_{10}(PO_4)_6]TiO_3 \cdot nH_2O \quad (1)$$

$$[Ca_{10}(PO_4)_6]TiO_2(OH)_2 \quad (2)$$

(In the formulae, n is an integer of from 0 to 3).

Further, the present invention is a sintered body obtained by sintering a titanium compound.

Further, the present invention is the above-described sintered body, wherein the titanium compound is represented by the formula (1) or (2).

Further, (lie present invention is the above-described sintered body, wherein the titanium compound is produced by adding an alkali to a solution containing a calcium ion, a titanium ion and phosphoric ion, thereby coprecipitating.

Further, the present invention is a sintered body comprising perovskite and whitlockite.

Further, the present invention is a sintered body substantially consisting of perovskite and whitlockite.

Further, the present invention is the above-described sintered body, wherein the perovskite and whitlockite are obtained by sintering a titanium compound.

Further, the present invention is the above-described sintered body, wherein the titanium compound is represented by the formula (1) or (2).

Further, the present invention, is the above-described sintered body, wherein the titanium compound is produced by adding an alkali to a solution containing a calcium ion, a titanium ion and phosphoric ion, thereby coprecipitating.

Further, the present invention is a method for producing a sintered body, comprising sintering a titanium compound.

Further, the present invention is the above-described production method, wherein the titanium compound is represented by the formula (1) or (2).

Further, the present invention is the above-described production method, wherein the titanium compound is produced by adding an alkali to a solution containing a calcium ion, a titanium ion and phosphoric ion, thereby coprecipitating.

Further, the present invention is the above-described production method, wherein the sintering is conducted at a temperature exceeding 800° C.

Further, the present invention is the above-described production method, wherein the sintering is conducted under an inert gas atmosphere and/or under reduced pressure.

Further, the present invention is the above-described production method, wherein the inert gas is xenon and/or argon.

Further, the present invention is the above-described production method, wherein the sintering is conducted under a pressure of $10^{-4}$ Pa or lower.

Further, the present invention is a sintered body obtained by sintering a mixture containing a titanium compound and an inorganic substance.

Further, the present invention is the above-described sintered body, wherein the titanium compound is represented by the formula (1) or (2).

Further, the present invention is the above-described sintered body, wherein the titanium compound is produced by adding an alkali to a solution containing a calcium ion, a titanium ion and phosphoric ion, thereby coprecipitating.

Further, the present invention is the above-described sintered body, wherein the inorganic substance is at least one selected from the group consisting of calcium hydroxy apatite, calcium fluoroapatite, β-tricalcium phosphate, α-tricalcium phosphate, tetracalcium phosphate, metallic titanium, titanium oxide and platinum.

Further, the present invention is a method for producing a sintered body, comprising sintering a mixture containing a titanium compound and an inorganic substance.

Further, the present invention is the above-described production method, wherein the titanium compound is represented by the formula (1) or (2).

Further, the present invention is the above-described production method, wherein the titanium compound is produced by adding an alkali to a solution containing a calcium ion, a titanium ion and phosphoric ion, thereby coprecipitating.

Further, the present invention is the above-described production method, wherein the inorganic substance is at least one selected from the group consisting of calcium hydroxyapatite, calcium fluoroapatite, β-tricalcium phosphate, α-tricalcium phosphate, tetracalcium phosphate, metallic titanium, titanium oxide and platinum.

Further, the present invention is the above-described production method, wherein the sintering is conducted at a temperature exceeding 800° C.

Further, the present invention is the above-described production method, wherein the sintering is conducted under an inert gas atmosphere and/or under reduced pressure.

Further, the present invention is the above-described production method, wherein the inert gas is xenon and/or argon.

Further, the present invention is the above-described production method, wherein the sintering is conducted under a pressure of $10^{-4}$ Pa or lower.

Further, the present invention is an artificial bone material, an artificial joint material, an artificial tooth material or an artificial dental root material, constituted of the above-described sintered body.

Further, the present invention is an artificial bone, an artificial joint, an artificial tooth or an artificial dental root, comprising the above-described sintered body.

BRIEF DESCRIPTION OF THE DRAWINGS

The upper column of FIG. 1 is a view showing X ray diffraction result of the sintered body of a titanium compound of the present invention; the middle column is a view showing X ray diffraction pattern, of whitlockite; and the lower column is a view showing X ray diffraction pattern of perovskite.

BEST MODE FOR CARRYING OUT THE INVENTION

Figure 1:
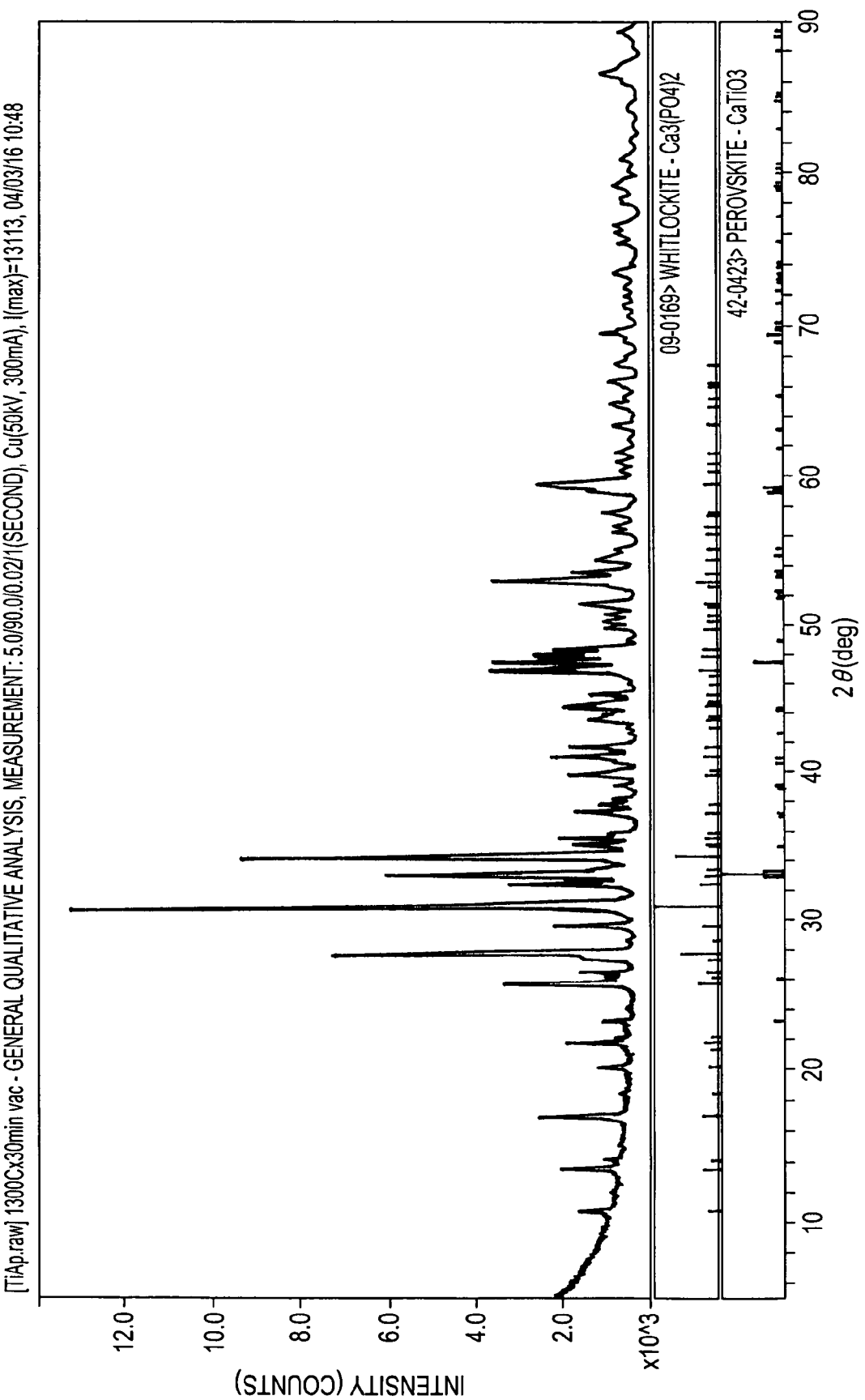

The titanium compound of the present invention is represented by the following formula (1) or (2), and has a structure of titanic acid apatite:

$$[Ca_{10}(PO_4)_6]TiO_3 \cdot nH_2O \tag{1}$$

$$[Ca_{10}(PO_4)_6]TiO_2(OH)_2 \tag{2}$$

(In the formulae, n is an integer of from 0 to 3).

In the formula (I), n is from 0 to 3, and is preferably 1 or 2.

The titanium compound of the present invention can be produced by, for example, a coprecipitation method of adding an alkali to a solution containing a calcium ion, a titanium ion and phosphoric ion, thereby coprecipitating. Specifically, for example, phosphoric acid is added to an aqueous solution containing calcium nitrate, titanium sulfate and a small amount of an alkali component dissolved therein, followed by aqueous ammonia is added to adjust pH to the vicinity of 9, and the suspension obtained is stirred at 80 to 100° C. for 4 to 8 hours, thereby a dispersion of the titanium compound can be obtained. This solution is filtered, and the material filtered off is washed and dried, thereby a powder of the titanium compound of the present invention can be produced. In dissolving calcium nitrate and titanium sulfate, formation, of calcium sulfate can be suppressed by adding a small, amount of an alkali component.

As a reaction formula in this case, the following is considered.

Reaction Formula 1:

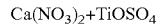

$Ca(NO_3)_2 + TiOSO_4$

Alkali neutralization

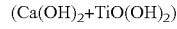

$(Ca(OH)_2 + TiO(OH)_2)$

$H_3PO_4$

$(Ca_{10})(PO_4)_6(OH)_2 + TiO(OH)_2)$

$NH_4OH$

$$[Ca_{10}(PO_4)_6](OH)_2 + TiO(OH)_2) \tag{1}$$

or

$$[Ca_{10}(PO_4)_6]TiO_2(OH)_2 \tag{2}$$

Next, the method for producing the sintered body of the titanium compound of the present invention is described.

The sintered body of the titanium compound of the present invention can be produced by sintering a powder of the titanium compound at a temperature exceeding 800° C. Where the temperature is 800° C. or lower, there is the possibility that the titanium compound cannot be sintered, or a sintered material easily disintegrates.

The upper limit of the sintering temperature is not particularly limited so long as the titanium compound can be sintered, but it is preferable to sinter at 1,500° C. or lower.

Further, the sintered body of the titanium compound of the present invention is preferable to sinter the titanium compound under an inert gas atmosphere and/or under reduced pressure. The inert gas used here is preferably xenon and/or argon. Further, pressure when sintering is preferably atmospheric pressure ($10^5$ Pa) or lower, more preferably 10 Pa or lower, further preferably $10^{-2}$ Pa or lower, and most preferably $10^{-4}$ Pa or lower. In this case, the sintering may be conducted only under an inert gas atmosphere, or only under reduced pressure. However, it is more preferable that the sintering is conducted under an inert gas atmosphere and also under reduced pressure.

The sintering time is not particularly limited so long as the sintered body of the titanium compound is obtained. However, for example, the sintering time can be 15 minutes or more, preferably 12 hours or more, more preferably 24 hours or more, and further preferably 48 hours or more. There is the tendency that longer sintering time provides a sintered body having higher hardness. Further, the upper limit of the sintering time is not particularly limited, and can appropriately be determined according fee hardness of the sintered body, and the like. However, for example, the upper limit can be 72 hours or less, and preferably 36 hours or less.

For example, when sintering for 30 minutes under an atmospheric pressure, it is preferable to sinter at 1,250 to 1,450° C., and when sintering for 30 minutes at $10^{-4}$ Pa, it is preferable to sinter at 850 to 1,350° C.

The sintered body of the titanium compound of the present invention comprises perovskite ($CaTiO_3$) and whitlockite ($Ca_3(PO_4)_2$). In this case, it is preferable from the standpoint of hardness that α-tricalcium phosphate (hereinafter referred to as "α-TCP"), anatase titanium dioxide or hydroxylapatite is not substantially contained in the sintered body of the titanium compound.

As a reaction formula in this case, the following is considered.

Reaction Formula 2:

$$[Ca_{10}(PO_4)_6]TiO_3 \cdot nH_2O \quad (1)$$

or $$[Ca_{10}(PO_4)_6]TiO_2(OH)_2 \quad (2)$$

←Sintering $$3Ca_3(PO_4)_2 + CaTiO_3$$

Whitlockite  Perovskite

Next, the sintered body obtained by sintering a mixture of the titanium compound and the inorganic substance is described.

The inorganic substance used in the present invention is not particularly limited so long as a sintered body can be obtained by mixing with the titanium compound. For example, calcium hydroxyapatite, calcium fluoroapatite, β-TCP, α-TCP, tetracalcium phosphate, metallic titanium, titanium oxide, platinum, and the like can be mentioned. Of those, β-TCP is preferable from the point that it can easily be substituted with a bone tissue in a living tissue. Further, those inorganic substances may be used alone or as mixtures of two or more thereof.

The sintered body of the mixture of the titanium compound and the inorganic substance of the present invention can be produced by sintering the mixture of fee titanium compound and the inorganic substance at a temperature exceeding 800° C.

The mixing ratio of the titanium compound and the inorganic substance is not particularly limited so long as a sintered body of the mixture is obtained. Weight ratio of titanium compound:inorganic substance can be 99:1 to 1:99, preferably 95:5 to 30:70, and more preferably 90:10 to 50:50.

Inert gas, pressure, temperature range, time, and the like used when sintering are appropriately determined depending on properties of the inorganic substance or its mixing ratio, but can be nearly the same as the conditions when producing the sintered body of the titanium compound as described above.

EXAMPLE 1

Production of Titanium Compound 0.1 mol of calcium nitrate ($Ca(NO_3)_2$) and 0.1 mol of titanium sulfate ($TiSO_4$) were dissolved in about 500 ml of water, followed by neutralizing with an alkali. After adding 0.06 mol of phosphoric acid ($H_3PO_4$), aqueous ammonia was added to adjust pH to 9.0, followed by stirring at 100° C. for 6 hours. The precipitates obtained was filtered off, and dried, thereby obtaining about 10 g of a powder of the titanium compound represented by the formula (1) or (2).

EXAMPLE 2

Sintering of Titanium Compound

About 3 g of the powder of the titanium compound obtained in Example 1 was kneaded with purified water, and placed in a mold, molded, and then air-dried. The air-dried product was dried in a drying oven at 100° C. for 24 hours. The dried sample was placed in a vacuum heat-treating machine, and held at various temperatures under an atmospheric pressure or in vacuum ($10^{-4}$ Pa) for 30 minutes to sinter the same. After stopping the heating, the sample was allowed to stand to room temperature. Regarding the sample sintered in vacuum, it was allowed to stand to room temperature, and after introducing argon gas, and was taken out. Regarding the sintered body of the titanium compound obtained, crystal analysis by X ray diffraction was conducted. FIG. 1 shows the result of X ray diffraction in the case of sintering at 1,300° C. in vacuum. Further, FIG. 1 also shows X ray diffraction patterns of perovskite and whitlockite. Further, the results are summarized in Table 1.

It is seen from Table 1 that in the case of sintering at 1,300° C. and 1,400° C. under atmospheric pressure, a sintered body substantially consisting of perovskite and whitlockite is obtained, and at from 900° C. to 1,300° C. under vacuum, a sintered body substantially consisting of perovskite and whitlockite is obtained.

Further, due to that those sintered bodies of the titanium compounds substantially consist of perovskite and whitlockite, it was proven that the titanium compound represented by the formula (1) or (2) changed perovskite and whitlockite by the above reaction formulae.

TABLE 1

| Sintering Temperature (° C.) | Under atmospheric Pressure | Under vacuum |
|---|---|---|
| Before sintering | Hydroxyapatite (Ti compound was slightly confirmed) | |
| 600 | — | Hydroxyapatite |
| 800 | Whitlockite Anatase $TiO_2$ Hydroxyapatite | Whitlockite Perovskite Hydroxyapatite |
| 900 | — | Whitlockite Perovskite |

TABLE 1-continued

| Sintering Temperature (° C.) | Under atmospheric Pressure | Under vacuum |
|---|---|---|
| 950 | — | Whitlockite Perovskite |
| 1000 | Whitlockite Anatase TiO$_2$ Hydroxyapatite | Whitlockite Perovskite |
| 1100 | Whitlockite Perovskite Hydroxyapatite | Whitlockite Perovskite |
| 1200 | Whitlockite Perovskite Hydroxyapatite | Whitlockite Perovskite |
| 1300 | Whitlockite Perovskite | Whitlockite Perovskite |
| 1400 | Whitlockite Perovskite | Whitlockite Perovskite α-TCP |
| 1500 | Whitlockite Perovskite α-TCP | Whitlockite Perovskite α-TCP |

EXAMPLE 3

About 3 g of a powder of a titanium compound produced by a coprecipitation method was kneaded with purified wafer, placed in a mold, molded, and then air-dried. The air-dried product was dried in a drying oven at 100° C. for 24 hours. The dried, sample was placed in a vacuum heat-treating machine, and held at various temperatures under an atmospheric pressure or in vacuum ($10^{-4}$ Pa) for 15 minutes to sinter the same. After stopping the heating, the sample was allowed to stand to room temperature. Regarding the sample sintered in vacuum, it was allowed to stand to room temperature, and after introducing argon gas, was taken out. Regarding the obtained sintered body of the titanium compound, microvickers hardness was measured. The results are shown in FIG. 2.

Figure 2:
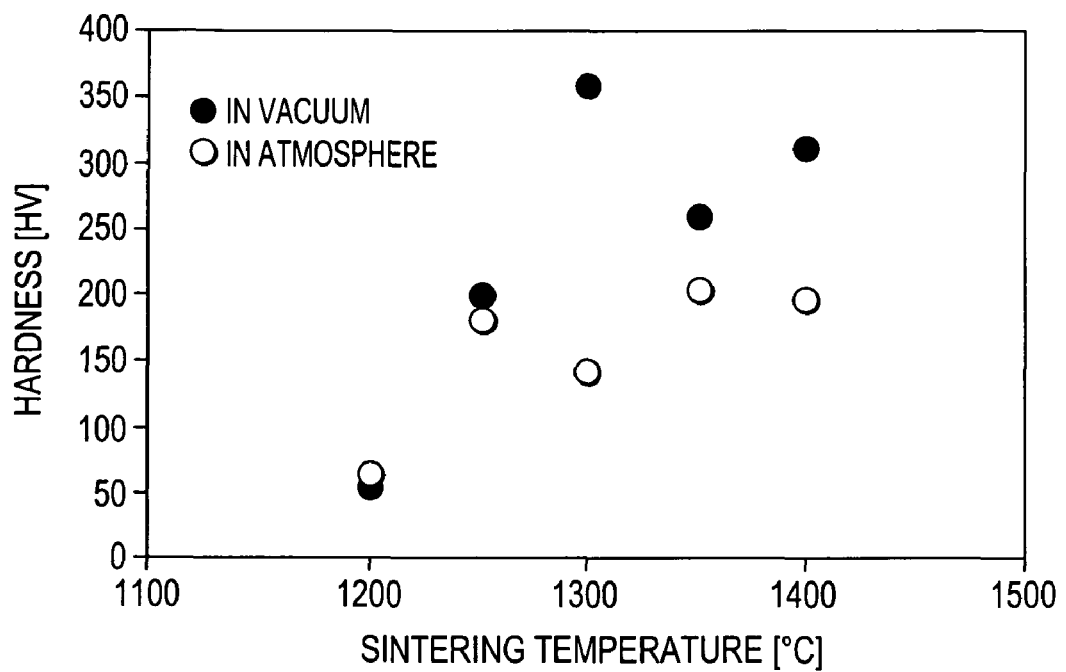
FIG. 2 is a view showing the relationship between a sintering temperature of the sintered body of a titanium compound and microvickers hardness.

It is seen from FIG. 2 that a sintered body of a titanium compound, having high hardness is obtained. Further, it is seen that a sintered body having higher hardness can be obtained in the case of sintering in vacuum, as compared with the case of sintering under atmospheric pressure.

EXAMPLE 4

About 3 g of a mixture obtained by mixing a powder of a titanium compound produced by a coprecipitation method and a powder of β-TCP as an inorganic substance was kneaded with purified water, molded and dried in the same manner as in Example 3. The dried sample was held at 1,350° C. under a pressure of $10^{-4}$ Pa for 15 minutes to sinter the same. Hie content of β-TCP to the whole amount of the mixture was 25 wt %. After stopping the heating, the sample was allowed to stand to room temperature, and after introducing argon gas, was taken out. Regarding die obtained sintered body of a mixture of the titanium compound and β-TCP, microvickers hardness was measured at three portions. The results are shown in FIG. 3.

Figure 3:
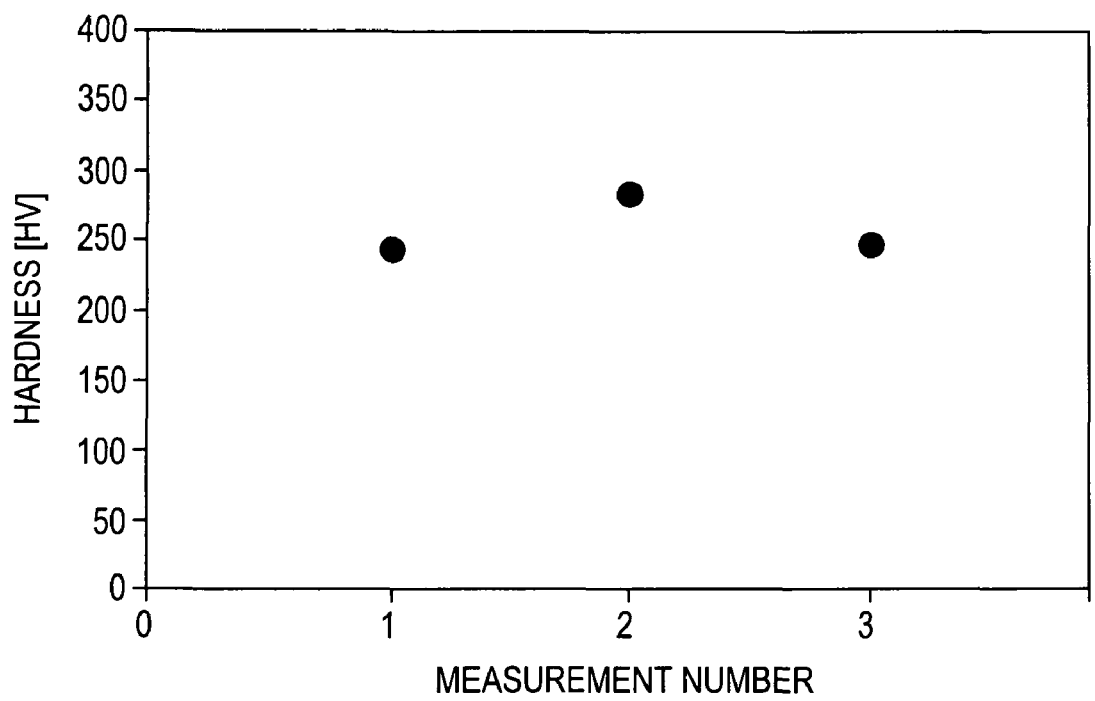
FIG. 3 is a view showing microvickers hardness of the sintered body of a mixture of the titanium compound and β-TCP.

It is seen from FIG. 3 that β-TCP, which is difficult to sinter alone, can be sintered by mixing with, a titanium compound.

Further, it is seen that the obtained sintered body of a mixture of the titanium compound and β-TCP has hardness equal to or higher than tire ease of the titanium compound alone.

INDUSTRIAL APPLICABILITY

The sintered body of the titanium compound of the present invention has high hardness, and can be used as an artificial bone material, an artificial joint material, an artificial tooth material or an artificial dental root (implant) material. Further, the sintered body of the titanium compound of the present invention can be processed to form an artificial hone, an artificial joint, an artificial tooth or an artificial dental root. Further, an artificial bone, an artificial joint, an artificial tooth or an artificial dental root can be obtained by sintering the sintered body of the titanium compound of the present invention into the desired shape of an artificial bone, an artificial joint, an artificial tooth or an artificial dental root.

The invention claimed is:

1. A method for producing a sintered body comprising: sintering a powder of a titanium compound, wherein said powder of said titanium compound is produced by coprecipitation wherein an alkali is added to a solution containing a calcium ion, a titanium ion and phosphoric ion, and said powder of said titanium compound is sintered at a temperature exceeding 800° C.

2. The method as claimed in claim 1, wherein said powder of said titanium compound is sintered under an inert gas atmosphere and/or under reduced pressure.

3. The method as claimed in claim 2, wherein said sintering is under an inert gas atmosphere and the inert gas is xenon and/or argon.

4. The method as claimed in claim 2, wherein said powder of said titanium compound is sintered under a pressure of $10^{-4}$ Pa or lower.

5. The method as claimed in claim 1, wherein a mixture of said powder of said titanium compound and an inorganic substance is sintered.

6. The method as claimed in claim 5, wherein the inorganic substance is at least one selected from the group consisting of calcium hydroxyapatite, calcium fluoroapatite, β-tricalcium phosphate, α-tricalcium phosphate, tetracalcium phosphate, metallic titanium, titanium oxide and platinum.

7. A sintered body obtained by the method according to claim 1.

8. A sintered body obtained by the method according to claim 5.

9. An artificial bone material, an artificial joint material, an artificial tooth material or an artificial dental root material, comprising the sintered body as claimed in claim 7.

10. An artificial bone material, an artificial joint material, an artificial tooth material or an artificial dental root material, comprising the sintered body as claimed in claim 8.

11. An artificial bone, an artificial joint, an artificial tooth or an artificial dental root, comprising the sintered body as claimed in claim 7.

12. An artificial bone, an artificial joint, an artificial tooth or an artificial dental root, comprising the sintered body as claimed in claim 8.

* * * * *